United States Patent
Koehler et al.

(10) Patent No.: US 7,398,764 B2
(45) Date of Patent: Jul. 15, 2008

(54) FUEL METERING UNIT FOR THE FUEL INJECTION SYSTEM OF A COMBUSTION ENGINE

(75) Inventors: Achim Koehler, Ditzingen (DE); Sascha Ambrock, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 469 days.

(21) Appl. No.: 10/532,972

(22) PCT Filed: Jul. 18, 2003

(86) PCT No.: PCT/DE03/02420

§ 371 (c)(1),
(2), (4) Date: Apr. 27, 2005

(87) PCT Pub. No.: WO2004/042225

PCT Pub. Date: May 21, 2004

(65) Prior Publication Data

US 2006/0042600 A1  Mar. 2, 2006

(30) Foreign Application Priority Data

Nov. 2, 2002  (DE) .............................. 102 51 014

(51) Int. Cl.
*F02M 59/36*  (2006.01)

(52) U.S. Cl. .................... 123/458; 123/446; 137/614.18

(58) Field of Classification Search ................. 123/456, 123/458, 506, 446; 137/614.18
See application file for complete search history.

(56) References Cited

U.S. PATENT DOCUMENTS

| | | | | |
|---|---|---|---|---|
| 4,714,089 A * | 12/1987 | Ueda et al. | ............. | 137/614.18 |
| 5,082,180 A | 1/1992 | Kubo et al. | | |
| 5,353,837 A * | 10/1994 | Faust | ..................... | 137/614.18 |
| 5,651,530 A | 7/1997 | Krimmer et al. | | |
| 6,446,606 B1 | 9/2002 | Krimmer et al. | | |
| 6,609,532 B1 * | 8/2003 | Peterson | .................. | 137/15.18 |
| 6,626,151 B2 * | 9/2003 | Boehm et al. | ............... | 123/458 |
| 6,840,220 B2 * | 1/2005 | Yomogida et al. | ........... | 123/456 |
| 2002/0134355 A1* | 9/2002 | Boehm et al. | ............... | 123/458 |
| 2003/0136384 A1 | 7/2003 | Van Der Linden et al. | | |

FOREIGN PATENT DOCUMENTS

| | | |
|---|---|---|
| DE | 39 43 183 A1 | 7/1990 |
| DE | 195 10 646 A1 | 10/1996 |
| DE | 198 53 103 A1 | 5/2000 |
| EP | 1 321 663 A2 | 6/2003 |

* cited by examiner

*Primary Examiner*—Carl S Miller
(74) *Attorney, Agent, or Firm*—Ronald E. Greigg

(57) ABSTRACT

Disclosed is a fuel metering unit for high-pressure pumps of fuel injection systems, whose leakproofness in zero delivery operation has been further improved and whose manufacture and assembly have been simplified.

17 Claims, 2 Drawing Sheets

FUEL METERING UNIT FOR THE FUEL INJECTION SYSTEM OF A COMBUSTION ENGINE

CROSS-REFERENCE TO RELATED APPLICATIONS

This application is a 35 U.S.C 371 application of PCT/DE 03/02420 filed on Jul. 18, 2003.

BACKGROUND OF THE INVENTION

1. Field of the Invention

The invention relates to a fuel metering unit for a fuel injection system for internal combustion engines, with a high-pressure pump driven as a function of the engine speed, wherein the fuel metering unit has a control valve that is actuated by an electromagnet and has a valve piston, wherein the valve piston is guided in a valve housing, wherein the valve piston is embodied as sleeve-shaped and its inner chamber contains a compression spring that holds it in contact with the armature pin, wherein the rear end of the compression spring rests against a spring plate disposed in the valve bore of the valve housing, wherein the wall of the valve housing has at least one, preferably several radial control openings that are formed and/or disposed so that the fuel quantity flowing through the fuel metering unit can be adjusted as a function of the valve piston stroke.

2. Description of the Prior Art

In the fuel metering unit described above, that is known from DE 198 53 103 A1, the spring plate is disposed behind the valve piston in the axial direction. In the exemplary embodiment described in conjunction with FIG. 8 of DE 198 53 103 A1, the valve disc can be provided with an axial sealing seat. In the closed position of the control valve, the valve piston comes into contact with the axial sealing seat and should thus tightly close the control valve so that no fuel travels through the fuel metering unit to the high-pressure fuel pump.

SUMMARY AND ADVANTAGES OF THE INVENTION

The fuel metering unit according to the invention for a fuel injection system for internal combustion engines includes the provision that the inner chamber of the valve piston is provided with a shutoff sleeve and that the valve piston and the shutoff sleeve constitute a shutoff valve.

Integrating the shutoff valve into the interior of the valve piston reduces the structural length of the metering unit and also significantly reduces the diameter of the axial sealing seat in comparison to the annular gap seal known from the prior art. As a result, in the closed position of the control valve, the fuel metering unit according to the invention is much more effective in shutting off the fuel supply to the high-pressure pump.

As a result, it is also possible to eliminate additional measures for avoiding an undesired pressure buildup during overrunning of the engine, for example the provision of a zero delivery throttle or of a second pressure control valve on the pressure side of the high-pressure pump. This contributes significantly to reducing costs.

It has turned out to be particularly advantageous for the shutoff valve to be embodied in the form of a ball valve and/or for a ball to be disposed between the shutoff sleeve and the valve piston and for the shutoff valve to have a sealing seat.

The use of a ball valve simplifies production since the ball can compensate for misalignments and angle errors that are virtually inevitable in manufacturing.

In order to assure that the ball is always disposed in its intended position, in another embodiment of the invention, the valve piston has a ball retainer that holds the ball in a definite position in relation to the valve piston.

In order to further simplify the manufacture and assembly of the fuel metering unit according to the invention, the spring plate can also be integrated into the shutoff sleeve. For example, this can be done by lathe-cutting an annular groove into the shutoff sleeve, which groove serves to fix the compression spring in place.

This reduces the number of parts and further reduces the structural length of the fuel metering unit according to the invention. It is also possible to adjust the control valve by axially shifting and subsequently fixing the shutoff sleeve in the valve bore. If the spring plate and the shutoff sleeve are two different components, then the axial position of both the spring plate and the shutoff sleeve in each control valve must be adjusted before they are initially placed in service, which increases the costs and the time required.

BRIEF DESCRIPTION OF THE DRAWINGS

Other advantages and advantageous embodiments and modifications of the invention can be inferred from the description contained herein below, taken in conjunction with the accompanying drawings, in which.

DESCRIPTION OF THE PREFERRED EMBODIMENTS

Figure 1:
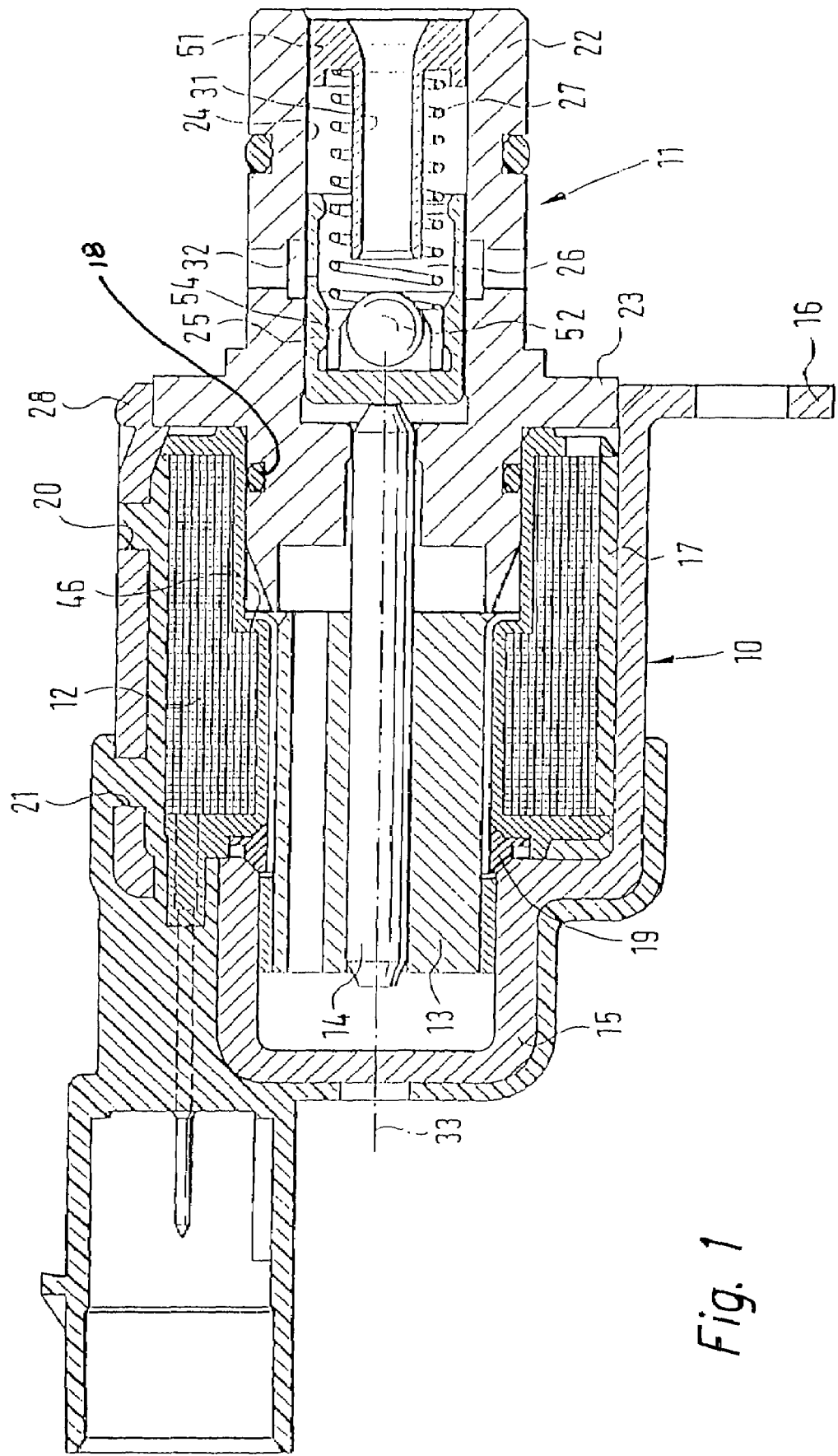
FIG. 1 shows a vertical longitudinal section through one embodiment of a fuel metering unit according to the invention.

The fuel metering unit according to FIG. 1 is based on an electromagnet 10 with an integrated control valve 11. In particular, the electromagnet 10 is comprised of a magnetic coil 12, an armature 13 with armature pin 14, and a magnetic cup 15 that partially encompasses the magnetic coil 12 and the armature 13.

The entire structural unit of the electromagnet 10 with the integrated control valve 11 is disposed inside a high-pressure fuel pump that is not shown. The magnetic cup 15 here serves simultaneously as a sealing element, as a magnetic yoke, and as a fastening element (see reference numeral 16) for attaching the electromagnet 10 into the high-pressure pump.

After the magnetic coil 12 has been inserted into the magnetic cup 15, it is completely extrusion coated. The extrusion coating labeled 17 assures an optimum heat transfer from the coil 12 to the magnetic cup 15. This makes it possible to counteract an overheating in critical operating states. The extrusion coating 17 also provides an advantageous fatigue strength and resistance to vibration, which in terms of oscillations as well as thermal stresses and environmental influences, allows the fuel metering unit 10, 11 to be installed in high-stress locations, e.g. of the high-pressure fuel pump.

In addition, the extrusion coating 17 of the magnetic coil 12, in cooperation with two sealing points 18, 19, assures that the contact points of the coil 12 with the connector lugs (not shown) are "dry". The magnetic coil winding and the contact points are thus optimally protected from being attacked by corrosive mediums.

"Overflow bores" 20, 21 are provided on the circumference of the magnetic cup 15 in order to assure that the extrusion coating 17 completely encompasses the magnetic coil 12.

The control valve 11 has a valve housing 22, which transitions into a flange-like extension 23 that simultaneously serves as the end seal for the magnetic cup 15. The valve housing 22 is provided with a valve bore 24 that is aligned coaxial to the armature pin 14 of the electromagnet 10. The valve bore 24 contains a movable, sleeve-shaped valve piston 25, whose inner chamber 26 contains a compression spring 27, a shutoff sleeve 51, and a ball 52.

Figure 2:
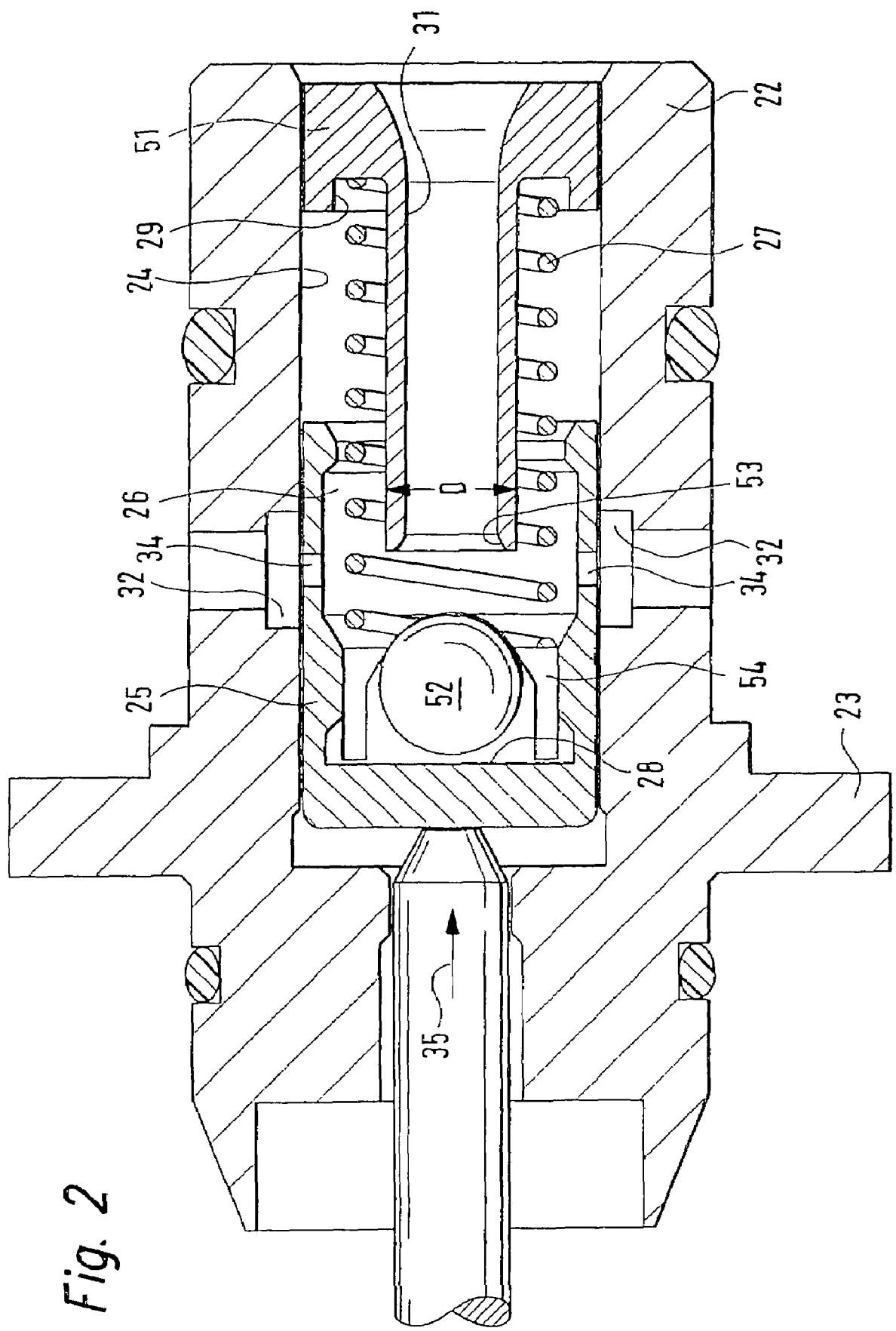
FIG. 2 shows an enlargement of the detail "A" from FIG. 1.

FIG. 2 gives a detailed depiction of the inner chamber 26, which clarifies the interaction of the above-mentioned components of the pressure control valve 11.

The front end of the compression spring 27 rests against a ball retainer 54 and its rear end rests in an annular groove 29 of the shutoff sleeve 51. The shutoff sleeve 51 is attached in the valve bore 24, for example by means of being press-fitted into it.

The ball retainer 54 in turn rests by means of the spring 27 against a bottom 28 of the valve piston 25, thus holding the valve piston 25 in contact with the front end of the armature pin 14.

In the position of the valve piston 25 shown in FIG. 1, an opening 31 of the shutoff sleeve 51 connects the inner chamber 26 of the valve piston 25 to a presupply pump (not shown) of the fuel injection system.

The valve housing 22 is also provided with a number of radially aligned control openings, two of which are shown in FIG. 1, labeled 32. The control openings 32 are connected in a hydraulically operative way to the low-pressure region of the high-pressure pump (not shown). A number of radial openings 34 are provided in the valve piston 25, which cooperate with the control openings 32 in the valve housing 22.

FIG. 1 shows the control valve 11 in the open state, in which the control openings 32 and the openings 34 in the valve piston 25 are hydraulically connected. In this position, the electromagnet 10 is without current and the compression spring 27 brings the valve piston 25 into the position shown in FIG. 1.

In the open position of the control valve 11 shown in FIG. 1, the fuel supplied to the control valve 11 at 31 flows through the shutoff sleeve 51, changes its flow direction at the end of this sleeve, and flows through the openings 34 in the valve piston 25 and the control openings 32 in the valve housing 22 in the direction of the high-pressure pump, not shown.

As has already been mentioned above, it has in practice turned out to be useful to provide not one, but several radial control openings 32 distributed over the circumference of the valve housing 22. DE 198 53 103 A1 describes the design of the control openings 32 in detail, and this description is incorporated herein by reference.

When the vehicle is being operated in overrunning mode, the control valve 11 does not have to be tightly closed to prevent it from leaking into the high-pressure pump during the overrunning operation. Such leaks of the control valve 11 lead to an undesired supply of fuel to the high-pressure pump and consequently to a pressure increase in the common rail of the fuel injection system. As a result of the pressure increase in the common rail, an undesirable noise generation can occur during overrunning operation ("hard combustion noise").

In order to assure the leakproofness of the control valve 11, a shutoff device comprised essentially of the shutoff sleeve 51 and the ball 52 is integrated into the valve piston 25. The function of this shutoff device will be explained below in conjunction with FIG. 2, which shows an enlargement of a detail from FIG. 1.

As is clear from FIG. 2, the shutoff sleeve 51 is provided with a sealing seat 53 against which the ball 52 rests in the closed position (not shown) of the control valve 11. The armature pin 14 presses the ball 52 into the sealing seat 53 by means of the bottom 28 of the valve piston 27. This breaks the hydraulic connection between the opening 31 and the control opening 32. The adjusting movement of the armature pin 14 in opposition to the compression spring 27 is achieved by providing the electromagnet 10 with a current that corresponds to the desired adjusting force. This adjusting movement is indicated by an arrow 35 in FIG. 2. When the ball 52 is resting against the sealing seat 53 of the shutoff sleeve 51 (position not shown), the control valve 11 is closed.

A suitable triggering of the electromagnet 10 can be used to set any number of intermediate positions of the valve piston 25 between the position that is shown and the closed position that is not shown. In these intermediate positions (not shown), the control valve 11 controls the fuel quantity aspirated by the high-pressure pump (not shown) and therefore controls the delivery capacity of the high-pressure pump.

The advantages of a ball valve are sufficiently known from the prior art and therefore do not require extensive explanation. In the context of the invention, however, it is important for the diameter D of the sealing seat 53 to be relatively small so that even a relatively low contact force of the armature pin 14 produces a high surface pressure between the ball 52 and the sealing seat 53 of the shutoff sleeve 51. This increases the leakproofness of the shutoff valve according to the invention.

Starting from the closed position of the control valve 11, not shown, if the power supply to the armature pin 14 is reduced, then the compression spring 27 moves the valve piston 25 in the direction of the armature pin 14 so that the ball 52 lifts up from the sealing seat 53. As a result, the ball retainer 54 lifts the ball 52 away from the sealing seat 53. Consequently, the ball 52 always has a definite position in relation to the valve piston 25 and cannot move back and forth between the bottom 28 of the valve piston 25 and the sealing seat 53. This back-and-forth motion would be disadvantageous to the performance quality of the control valve 11.

The direction of the flow through the control valve 11 can also be reversed. In this case, the opening 31 would be hydraulically connected to the low-pressure region of the high-pressure pump, while the control opening 32 would be connected to the pressure side of the presupply pump and would thus constitute the inlet into the metering unit.

Before the fuel metering unit is initially placed into service, it is necessary to adjust the control valve 11. This is done by appropriately shifting the shutoff sleeve 51 axially in the valve bore 24 and then fixing it in place. In particular, the adjusting process occurs as follows:

First, the electromagnet 10 is supplied with a definite current. Then, the shutoff sleeve 51 is slid into the valve bore 24 until a definite volumetric flow is passing through the control openings 32. In this position, the shutoff sleeve 51 is fixed in place in the valve bore 24, e.g. in that the shutoff sleeve 51 is embodied as a press-fitted part or in that the valve housing 22 is plastically deformed from outside. It is advantageous if the valve adjusting point is located in the region of minimal fuel flow quantities since this makes it possible to precisely adjust the tolerance-sensitive idle range.

The axial position of the sealing seat 53 in relation to the bottom 28 of the valve piston 25 and the ball 52 is established at the same time as the adjustment of the control valve 11. This assures that in the closed position of the valve piston 25, the ball 52 closes the shutoff sleeve 51 and as a result, no fuel travels through the control opening 32. Integrating the annular groove 29 into the shutoff sleeve can reduce to 1 the number of required adjustment steps, which significantly reduces production costs of the metering unit. p The foregoing relates to preferred exemplary embodiments of the invention, it being understood that other variants and embodiments thereof are possible within the spirit and scope of the invention, the latter being defined by the appended claims.

The invention claimed is:

1. In a fuel metering unit for a fuel injection system for internal combustion engines with a high-pressure pump driven as a function of the engine speed, wherein the fuel metering unit has a control valve (11) that is actuated by an electromagnet (10) and has a valve piston (25), wherein the valve piston (25) is guided in a valve housing (22), wherein the valve piston (25) is embodied as sleeve-shaped and its inner chamber (26) contains a front end of a compression spring (27) that holds it in contact with an armature pin (14), and wherein a rear end of the compression spring (27) rests against a spring plate disposed in a valve bore (24) of the valve housing (22), wherein the wall of the valve housing (22) is provided with at least one radial control openings (32) that are formed and disposed so that the fuel quantity flowing through the fuel metering unit can be adjusted as a function of the stroke of the valve piston (25), the improvement comprising a shutoff sleeve (51) positioned at least partially in the inner chamber (26) of the valve piston (25), the valve piston (25) and the shutoff sleeve (51) constituting a shutoff device.

2. The fuel metering unit according to claim 1, wherein the shutoff device includes a ball valve (52, 53).

3. The fuel metering unit according to claim 2, wherein a ball (52) is disposed between the shutoff sleeve (51) and the valve piston (25), and wherein the shutoff sleeve (51) has a sealing seat (53).

4. The fuel metering unit according to claim 2, wherein the valve piston (25) has a ball retainer (54), and wherein the ball retainer (54) holds the ball (52) in a definite position in relation to the valve piston (25).

5. The fuel metering unit according to claim 3, wherein the valve piston (25) has a ball retainer (54), and wherein the ball retainer (54) holds the ball (52) in a definite position in relation to the valve piston (25).

6. The fuel metering unit according to claim 1, wherein the spring plate includes a groove in which the rear end of the compression spring (27) is positioned.

7. The fuel metering unit according to claim 2, wherein the spring plate includes a groove in which the rear end of the compression spring (27) is positioned.

8. The fuel metering unit according to claim 3, wherein the spring plate includes a groove in which the rear end of the compression spring (27) is positioned.

9. The fuel metering unit according to claim 4, wherein the spring plate includes a groove in which the rear end of the compression spring (27) is positioned.

10. The fuel metering unit according to claim 5, wherein the spring plate includes a groove in which the rear end of the compression spring (27) is positioned.

11. The fuel metering unit according to claim 1, wherein the control valve (11) can be adjusted by appropriately shifting the shutoff sleeve (51) axially in the valve bore (24) and then fixing it in place.

12. The fuel metering unit according to claim 2, wherein the control valve (11) can be adjusted by appropriately shifting the shutoff sleeve (51) axially in the valve bore (24) and then fixing it in place.

13. The fuel metering unit according to claim 3, wherein the control valve (11) can be adjusted by appropriately shifting the shutoff sleeve (51) axially in the valve bore (24) and then fixing it in place.

14. The fuel metering unit according to claim 4, wherein the control valve (11) can be adjusted by appropriately shifting the shutoff sleeve (51) axially in the valve bore (24) and then fixing it in place.

15. The fuel metering unit according to claim 5, wherein the control valve (11) can be adjusted by appropriately shifting the shutoff sleeve (51) axially in the valve bore (24) and then fixing it in place.

16. The fuel metering unit according to claim 6, wherein the control valve (11) can be adjusted by appropriately shifting the shutoff sleeve (51) axially in the valve bore (24) and then fixing it in place.

17. The fuel metering unit according to claim 1, wherein the shutoff sleeve (51) is positioned within the valve bore (24) and forms a guide collar which maintains the compression spring (27) between the guide collar and the valve bore (24).

* * * * *